Sept. 29, 1925.
L. R. HUFF
1,555,709
HYDRAULIC PRESSURE CONTROLLING DEVICE
Filed July 5, 1924
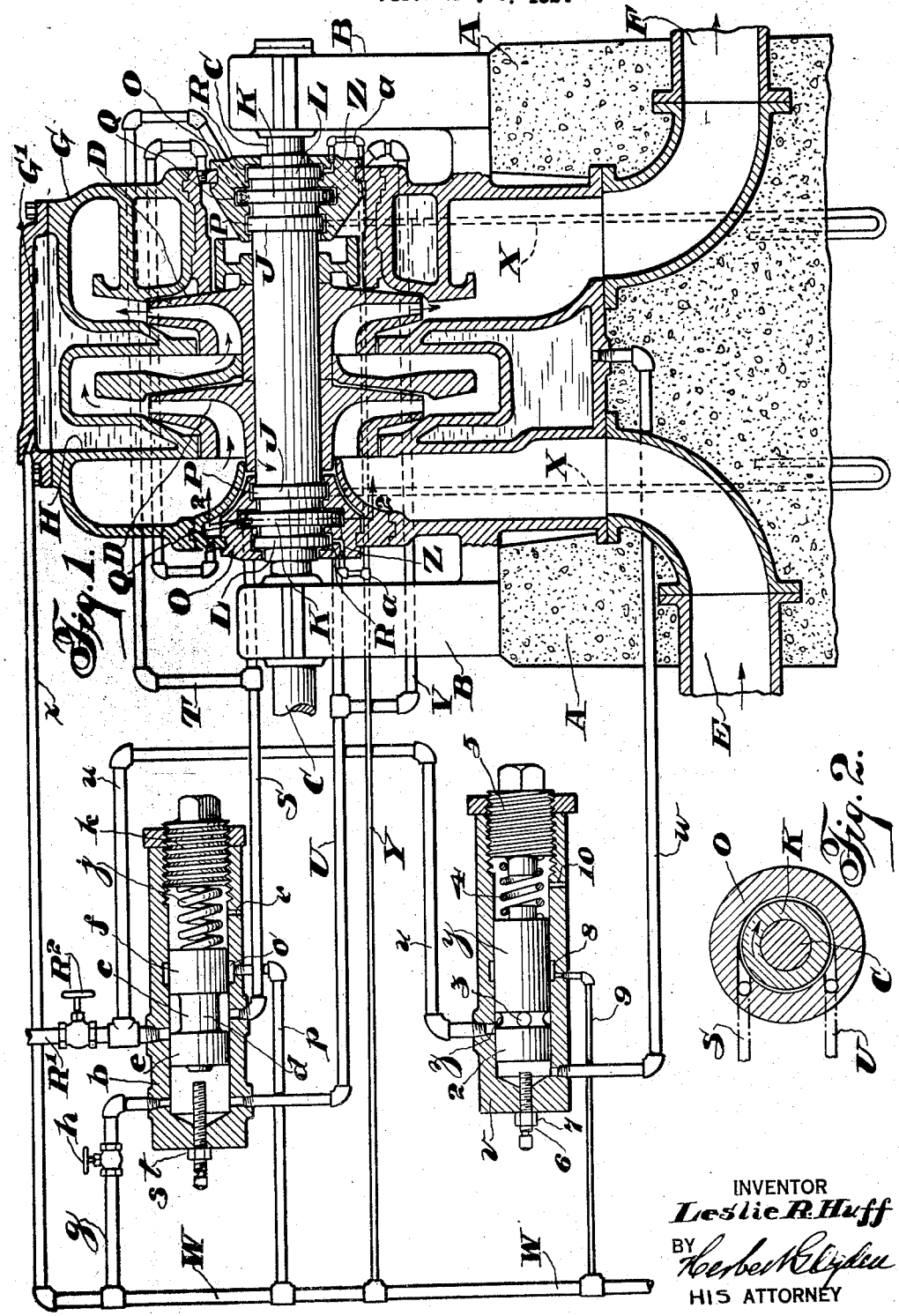
INVENTOR
*Leslie R. Huff*
BY
*Herbert Glyden*
HIS ATTORNEY Patented Sept. 29, 1925.

1,555,709

UNITED STATES PATENT OFFICE.

LESLIE R. HUFF, OF PHILLIPSBURG, NEW JERSEY, ASSIGNOR TO INGERSOLL-RAND COMPANY, OF JERSEY CITY, NEW JERSEY, A CORPORATION OF NEW JERSEY.

HYDRAULIC-PRESSURE-CONTROLLING DEVICE.

Application filed July 5, 1924. Serial No. 724,245.

*To all whom it may concern:*

Be it known that I, LESLIE R. HUFF, a citizen of the United States, and a resident of Phillipsburg, county of Warren, and State of New Jersey, have invented a certain Hydraulic-Pressure-Controlling Device, of which the following is a specification accompanied by drawings.

This invention relates to engines, pumps, compressors, turbo blowers and other similar machines, but more particularly to an automatic regulator for maintaining substantially constant pressure of the liquid supplied to an auxiliary chamber in such a machine, whether such chamber is for the purpose of a water seal between relatively movable parts, or for water jacketing the main casing or cylinder, or is an auxiliary chamber of any kind in which it is desirable to maintain a flow of liquid under substantially constant pressure.

Some fluids which are injurious to health, inflammable or dangerous in some other respect, are often supplied to turbo machines, engines, pumps, compressors and other similar machines, from which they are delivered to any desired place. It is therefore essential that these fluids be kept within the casing of these machines, and not permitted to escape therefrom owing to their dangerous characteristics. For example, the greater part of the casing of a turbo machine may be readily insulated from the atmosphere but the rotatable shaft, which extends through the casing, and on which are mounted the usual impellers, presents a much more difficult problem, owing more particularly to the fact that it is a physical impossibility to insert packing between the casing and the rotating shaft, which would last for any extended period of time.

One method of forming a seal between the moving shaft of a turbo machine and the casing, is by means of a hydraulic seal, and this is especially advantageous owing to the fact that water creates but little friction on the shaft and has been found to effect an efficient seal between the casing and the shaft. Water is usually introduced into the seals from any suitable source as mains, but this is objectionable, because the pressure in these mains varies continuously and the water pressure in these hydraulic seals must be proportional to the velocity of the rotating shaft. If the water pressure exerted on the seal is excessive, the H. P. of the turbo machine will consequently be diminished, and on the other hand, if the water pressure is too low with relation to the velocity of the shaft, the water will be forced directly from the shaft and no seal will be created. It is therefore not only advantageous, but especially desirable that the water pressure be kept proportional to the velocity of the shaft in order to maintain an effective and efficient seal.

In supplying cooling water to machines, several facts must be taken into consideration. The water pressure must be sufficient to keep the water flowing continuously throughout the entire casing, and this is especially important in the casings of some turbo machines, which are extremely large. The pressure on the water must be great enough to force the water to all parts of the machine, so that every part of the machine is adequately cooled, in order to obtain the maximum efficiency of the machine. Grit and mud in the cooling water often settle to the bottom of the casing and therefore the water pressure must be sufficient to force the water through the mud or else carry the mud from the casing. Another fact to be considered is corrosion which takes place in these casings, especially when salt water is used for cooling purposes, and this corrosion reduces the size of the water passages. Probably the greatest factor to be considered however, is the frictional loss of the water passing through the casing and, as above pointed out, the water from the mains, which is not only used as a seal but also for cooling purposes, ordinarily has fluctuating pressures. It is a desideratum that the cooling water freely pass through the casings of machines, and that there be adequate pressure so that every part of the casing receives sufficient cooling water.

One object of the present invention is to enable the pressure of liquid introduced into machines for auxiliary purposes to be maintained substantially constant, irrespective of fluctuating pressure in the main supply line.

Another object of the invention is to produce an automatic liquid pressure controlling device for the above mentioned types of machines in order that the pressure of the liquid supplied to the machine for auxiliary purposes may be maintained substantially constant irrespective of the fluctuating pressures in the main supply line.

A further object of the invention is to enable the pressure of the liquid introduced into machines for auxiliary purposes to be regulated as desired in a simple and convenient manner.

Further objects of the invention will hereinafter appear, and the invention is shown in one of its preferred embodiments in the accompanying drawings, in which Figure 1 is a diagrammatic vertical sectional view of a turbo blower and a hydraulic pressure controlling device connected thereto, and Figure 2 is a transverse sectional view taken on the line 2—2 of Figure 1, looking in the direction of the arrows.

Referring to the drawings, A designates the foundation upon which are located suitable supports B, and a rotatable shaft C of the turbo machine is mounted upon these supports. Although a turbo machine is shown in the drawings, it is to be understood that this type of machine is merely shown for illustrative purposes, because the invention is also applicable to various other types of machines. Any suitable means, as a steam turbine or electric motor, may be provided for rotating the shaft C. The usual impellers D are rotatably mounted on the shaft C and fluid is supplied to the machine through the inlet conduit E and discharged therefrom through the outlet conduit F. A suitable casing G having a cover G' entirely encloses the turbo machine and is preferably formed with a cooling water reservoir or jacket H, which entirely surrounds the rotating parts of the machine. A series of collars or rings J, K and L are in this instance pressed on each end of the shaft C and the central ring K is somewhat larger than the rings J and L. Packing boxes O, preferably of aluminum, in this instance surround the outer end portions of the shaft C and are formed with annular recesses P, Q and R, into which the rings J, K and L respectively extend.

Whenever a dangerous fluid is supplied to the turbo machine, it is essential that provision be made for preventing its escape from the machine, and in order to prevent fluid from escaping between the rotating shaft C and the packing boxes O, liquid such as water, is forced into an auxiliary chamber formed between the rotating shaft and the packing box, and in this instance, water from the main supply line R' is forced through a supply line S and by-pass line T to the annular groove Q in each of the packing boxes O, and this water is forced from the recesses Q in the packing boxes O due to the rapid rotation of the rings K through the discharge line U and by-pass line V to the main discharge line W. The water which escapes from the central grooves Q to the grooves P is forced therefrom into drain pipes X which lead to any suitable point outside the casing of the machine. The water which escapes along the shaft C to the grooves R is forced by the rings L into a small discharge pipe Y through passages Z in the packing box O and connecting pipes a. The small discharge pipe Y may connect with the main discharge line W, as shown in the drawings.

The pressure of the water from the main supply line R' fluctuates from time to time and in order that the pressure of the water seal about the shaft C may be maintained substantially constant for different velocities of the shaft, a valve casing b is connected to the main supply line R', supply line S and to the discharge line U, which leads from the central grooves Q in the packing boxes O. A valve c having a stem d and heads e and f, is in this instance slidably mounted in the casing b. In the normal position of the valve, water from the main supply line R' is permitted to pass through the casing b about the stem d of the valve and into the supply lines S and T for supplying water to the central grooves Q in the packing boxes O. The water from the central grooves Q passes into the casing b rearwardly of the valve head e and into the main discharge line W through a pipe g having a suitable controlling valve h.

If the water pressure in the main supply line R' and in the discharge line U is the same, the valve c will be moved to its right hand position owing to the larger pressure area on the head e, tending to force the valve to its right hand position, than the water pressure in the main supply line R', tending to move the valve to its left hand position. In order to maintain the valve c normally in its open position to permit the water from the main line R' to pass to the turbo machine, a coil spring j is preferably interposed between the head f of the valve c and the plug k which is in this instance screwed into one end of the valve casing b. Whenever the water pressure in the discharge line U exceeds the pressure in the main supply line R' and is sufficient to overcome the resistance of the spring j, the valve c will be moved to its right hand position, thereby closing the main supply line R', until the water pressure in the discharge line U has dropped to such a point that the spring j will be sufficient to restore the valve c to its open position and enable the water to be again introduced into the central grooves Q in the packing boxes O.

In this manner a substantially constant water pressure is maintained in the grooves Q and the water serves as a seal for preventing fluids from escaping from the casing G along the rotating shaft C. The pressure of the water about the shaft C should be proportional to the speed at which the shaft is rotating, because if there is insufficient water pressure for the seal, and the shaft is rotating rapidly, the water will be directly forced from the grooves Q, and on the other hand if there is too great water pressure, the friction on the rotating shaft will reduce the H. P. of the machine. By manipulating the plug $k$ to vary the tension of the spring $j$, the pressure required to move the valve $c$ may be readily varied. By increasing the tension of the spring $j$, a greater water pressure will be required to move the valve to close off the water from the main supply line R' and by reducing the tension on the spring $j$ the water pressure serving as a seal for the shaft C will accordingly be reduced.

An annular groove $o$ is preferably formed in the casing $b$ and a pipe $p$ leads from this groove to the main discharge line W, so that any water which seeps past the head $f$ of the valve $c$ will pass from the valve casing $b$. In order that atmospheric pressure will be maintained in rear of the head $f$, an atmospheric vent $r$ is formed in the casing $b$. A set screw $s$ in one end of the casing $b$ is adapted to be locked in any desired position by a lock nut $t$ and serves as a stop for limiting the movement of the valve $c$ so that the head $f$ will not be moved to such a position as to shut off the passage of water from the main supply line R'.

Cooling water is supplied to the reservoir or jacket H for cooling the turbo machine and in this instance, a supply line $u$ is connected to the main supply line R' and water is permitted to pass from the supply line $u$ through a valve casing $v$ and supply line $w$ to the lower part of the jacket. Water from the jacket H is adapted to pass from the upper part of the casing through a discharge line $x$ in the cover G' into the main discharge line W. A valve $y$ is preferably slidable in the casing $v$ and is formed with an external annular groove $z$ which communicates with a passage 2 in the valve by means of radial ports 3. In the normal position of the valve, water is permitted to flow from the pipe $u$ through the groove $z$, ports 3 and through the passage 2 into the supply line $w$. A coil spring 4 in this instance is interposed between one end of the valve $y$ and a plug 5. By manipulating the plug 5 and thus varying the tension of the spring 4, the water pressure in the jacket H may be readily varied. Whenever the water pressure in the jacket H is sufficient to overcome the resistance of the spring 4, the valve $y$ will be moved to a position to close the passage of water from the main supply line R' and as soon as the water pressure in the jacket H has dropped to such a point that the spring 4 will be able to move the valve $y$, water will be again admitted to the jacket. A set screw 6 is adapted to be locked in place by a lock nut 7, and serves as a stop for limiting the movement of the valve $y$. An annual groove 8 is preferably formed in the valve casing $v$ and a pipe 9 connects this groove with the main discharge line W, so that any water which seeps around the valve will pass from the casing. An atmospheric vent 10 in the casing $v$ maintains atmospheric pressure on one end of the valve $y$. By increasing the tension of the spring 4 the water pressure in the jacket H will be increased and by decreasing the tension on the spring 4, the water pressure in the jacket H will be decreased. In this manner a constant water pressure may be maintained in the jacket H irrespective of the fluctuating pressures in the main supply line R'. A suitable valve R² in the main supply line R' enables the water supplied to the turbo machine for sealing and cooling purposes to be controlled, or entirely shut off when the machine is idle.

From the above description, it will be observed that by means of this invention the pressure of liquids supplied to a chamber in a machine of the types heretofore mentioned for auxiliary purposes such as for cooling, for effecting a fluid tight seal, or other conceivable purposes can be automatically regulated in order to maintain a substantially constant liquid pressure in the chamber irrespective of the main supply line pressure.

I claim:

1. A hydraulic pressure controlling device comprising a cylinder, a reciprocatory valve freely rotatable in said cylinder and having a reduced intermediate portion, a pressure fluid inlet line controlled by the valve, a pressure fluid outlet line in constant communication with the reduced portion, a discharge line associated with the outlet line and connected to the forward end of the cylinder for conveying fluid under pressure through the cylinder to move the valve in one direction, and automatic means for moving the valve in the opposite direction.

2. A hydraulic pressure controlling device comprising a cylinder, a reciprocatory valve freely rotatable in said cylinder and having a reduced intermediate portion forming end heads, a pressure fluid inlet line controlled by one of the heads, a pressure fluid outlet line in constant communication with the reduced portion, a discharge line associated with the outlet line and connected to the cylinder for conveying fluid under pressure therethrough whereby the valve will be closed when the pressure in the forward end of the cylinder reaches a predetermined value, a spring to automatically open the valve, and means for adjusting the tension of said spring.

3. A hydraulic pressure controlling device comprising a cylinder, a reciprocatory valve freely rotatable in said cylinder and having a reduced intermediate portion forming end heads, a pressure fluid inlet line controlled by one of the heads, a pressure fluid outlet line in constant communication with the reduced portion, a discharge line associated with the outlet line and connected to discharge fluid under pressure through the cylinder for closing the valve when the pressure in the forward end of the cylinder reaches a predetermined value, a spring for automatically opening the valve, and a plug in one end of the cylinder forming a bearing for one end of the spring and whereby the tension of the spring may be varied for different pressures, and an adjustable stop in the other end of the cylinder for limiting the forward movement of the valve.

In testimony whereof I have signed this specification.

LESLIE R. HUFF.